United States Patent [19]

Schucker

[11] Patent Number: 4,837,054

[45] Date of Patent: Jun. 6, 1989

[54] THIN FILM COMPOSITE MEMBRANE PREPARED BY DEPOSITION FROM A SOLUTION

[75] Inventor: Robert C. Schucker, Baton Rouge, La.

[73] Assignee: Exxon Research and Engineering Company, Florham Park, N.J.

[21] Appl. No.: 108,820

[22] Filed: Oct. 14, 1987

[51] Int. Cl.$^4$ ................................................. B05D 5/00
[52] U.S. Cl. ................................. 427/244; 427/385.5
[58] Field of Search ............................. 427/244, 385.5

[56] References Cited

U.S. PATENT DOCUMENTS

| | | | |
|---|---|---|---|
| 2,970,106 | 1/1961 | Binning et al. | 208/347 |
| 3,370,102 | 2/1968 | Carpenter et al. | 260/674 |
| 3,456,037 | 7/1969 | Hoeschele | 260/858 |
| 3,567,810 | 3/1971 | Baker | 264/41 |
| 3,647,845 | 3/1972 | Riley | 210/490 |
| 3,709,774 | 1/1973 | Kimura | 161/159 |
| 3,734,880 | 5/1973 | Finelli | 260/37 |
| 3,776,970 | 12/1973 | Strazik et al. | 260/669 |
| 3,876,738 | 4/1975 | Marinaccio et al. | 264/41 |
| 3,936,409 | 2/1976 | Schroeder et al. | 524/104 |
| 4,009,307 | 2/1977 | Erikson et al. | 427/377 |
| 4,086,209 | 4/1978 | Hara et al. | 260/49 |
| 4,115,465 | 9/1978 | Elfert et al. | 260/674 |
| 4,340,479 | 7/1982 | Pall | 210/490 |
| 4,423,099 | 12/1983 | Mueller et al. | 525/903 |
| 4,528,004 | 7/1985 | Makino et al. | 55/158 |
| 4,532,316 | 7/1985 | Henn | 528/59 |

FOREIGN PATENT DOCUMENTS

| | | |
|---|---|---|
| 50789 | 5/1982 | European Pat. Off. . |
| 150620 | 9/1981 | Fed. Rep. of Germany . |
| 151874 | 11/1981 | Fed. Rep. of Germany . |
| 151952 | 11/1981 | Fed. Rep. of Germany . |
| 3513980 | 10/1986 | Fed. Rep. of Germany . |
| 4143778 | 11/1979 | Japan . |
| 8087115 | 5/1983 | Japan . |
| 9059220 | 4/1984 | Japan . |
| 250049 | 12/1985 | Japan . |
| 223370 | 5/1986 | Japan . |
| 1391559 | 4/1975 | United Kingdom . |
| 2115344 | 9/1983 | United Kingdom . |

OTHER PUBLICATIONS

"Quantitiative DSC Evaluation of Phase Segregation Rate in Linear Segmented Polyurethanes and Polyurethaneureas", Camberlin et al.; J. Poly Science: Polymer Chemistry Edition, vol. 24, 415–423, (1983).

"Phase Segregation Kinetics in Segmented Linear Polyurethanes: Relations between Equilibrium Time and Chain Mobility and between Equilibrium Degree of Segregation and Interaction Parameter", Camberlin et al.; J. Poly Science; Polymer Physics Edition; vol. 22, 1835–1844, (1984).

"New Linear Polyurethaneureas Based on Polyoxytetramethylene, Aliphatic Diisocyanates, and Aromatic Diamines", Knaub et al.; J. of Applied Polymer Science, vol. 32, 5627–5645, (1986).

Primary Examiner—Janyce Bell
Attorney, Agent, or Firm—Joseph J. Allocca

[57] ABSTRACT

Thin film composite membranes comprising a thin active selective layer deposited from a solution onto a thicker porous non-selective support layer are disclosed. In particular, a thin film of polyurea/urethane is coated onto a microporous support substrate from a specific multi-component solvent system. Effective film thicknesses of less than 1 micron can be achieved, said thin films being virtually defect free. Asymmetric-composite membranes consisting of a thin active layer of polyurea/urethane on a microporous support substrate are useful for separating aromatics from saturates, especially under pervaporation or perstraction conditions.

6 Claims, 1 Drawing Sheet

THIN FILM COMPOSITE MEMBRANE PREPARED BY DEPOSITION FROM A SOLUTION

BRIEF DESCRIPTION OF THE INVENTION

Thin film composite membranes comprising a thin active selective layer deposited from a solution onto a thicker porous non-selective support layer are disclosed. In particular, a thin film of polyurea/urethane is coated onto a microporous support substrate from a specific multi-component solvent system. Effective film thicknesses of less than 1 micron can be achieved, said thin films being virtually defect free. Thin film composite membranes consisting of a thin active layer of polyurea/urethane on a microporous support substrate are useful for separating aromatics from saturates, especially under pervaporation or perstraction conditions.

DETAILED DESCRIPTION OF THE INVENTION

In the present invention a solution of the polyurea/urethane copolymer is prepared in a solution system consisting of an aprotic solvent such as dimethylformamide, a cyclic ether, such as dioxane, cellosolve acetate or methyl cellosolve and a wetting agent such as crotyl alcohol. This polymer/solvent solution is then deposited as a thin film (e.g. poured or sprayed) onto a microporous support substrate after which excess polymer/solvent solution is permitted to drain from the support. Thereafter, the solvents are permitted to evaporate leaving a thin layer of active polyurea/urethane copolymer on the support backing.

The solution deposition procedure of the present invention is employed to produce a thin film composite membrane of polyurea/urethane on a support when the support upon which the thin active polymer layer is to be deposited is insoluble in the solvents used to produce the polyurea/urethane in solvent solutions.

Substrates which are insoluble in the solvents used to produce the aforementioned copolymer or polymer solutions are of the polyolefin variety, e.g., polyethylene and polypropylene, and teflon. These substrates can be made microporous in nature and do not in and of themselves normally contribute to the selectivity of the final composite membrane system. The support substrate will typically possess pores small enough to just trap in the surface of the support layer the polymer in the solvent system. Preferably the support substrate will possess a molecular weight to cut off of about 10,000 to 100,000.

This support substrate may take any imaginable physical shape and can be in the form of sheets, tubes, fibers, etc.

The polyurea/urethane polymers which constitute the thin active layer of the composite membranes is prepared as a true solution of the desired polymer or copolymer in solvent. As previously stated the solvent system employed in the present process constitutes a mixture of (a) an aprotic solvent such as dimethylformamide (DMF), (b) a cyclic ether such as dioxane, (c) cellosolve acetate or methylcellosolve and (d) a wetting agent such as crotyl alcohol. These solvents are used in a parts per hundred ratio of a/b/c/d in the range about 3-27/94-33/2-33/1-7.

The polyurea polymer or polyurea/urethane copolymer exists as a true, complete polymer in the solvent system and the polymer-solvent system exists as a true solution.

The polymer-solvent solution as prepared can have a polymer concentration of anywhere up to about 40 parts polymer or more in the solution based on 100 parts solvent. A polymer-solvent solution containing the quantity of polymer would produce a thin film composite membrane if deposited on the support substrate but the active layer laid down could be too thick for some applications. It is preferred that the polymer concentration in the solution be in the range of about 0.5 to about 20 parts polymer, preferably about 1-10 parts polymer, more preferably about 1-5 parts polymer per 100 parts solvent solution.

Thin film composite membrane made by depositing a thin active layer of polyurea/urethane or polyurea from a polymer solvent solution system onto a microporous support substrate are useful for separating aromatic hydrocarbons from saturated hydrocarbons and are of particular utility in the chemicals industry for recovering/concentrating aromatics such as benzene, toluene, xylenes, etc. from chemicals streams and in the petroleum industry for recovering aromatics from saturates in heavy feed streams such as naphtha, catalytic naphtha, heavy cat naphtha, light gas oils, light cat gas oils, etc.

The polyurea/urethane copolymer used to produce the thin active layer of the thin film composite membrane herein described and which is effective when in the form of membranes in performing the separating are described in copending Application U.S. Ser. No. 108,822 filed even date herewith in the name of Robert C. Schucker.

The polyurea/urethane layer which is effective in separating aromatics from saturates is distinguished by possessing certain and specific characteristics.

The polyurea/urethane polymer used to produce the thin active layer is characterized by possessing a urea index of at least about 20% but less than 100%, an aromatic carbon content of at least about 15 mole percent, a functional group density of at least about 10 per 1,000 grams of polymer and C=O/NH ratio of less than about 8.

The aromatic polyurea/urethane layer is produced using a solution of aromatic polyurea/urethane copolymer in solvent, the copolymer is itself prepared by reacting dihydroxy or polyhydroxy compounds (e.g., polyethers or polyesters of about 500 to 5,000 molecular weight, or mixtures of different molecular weight polymers of the same type, i.e., about 30:70/70:30 mixtures of an about 250 molecular wt. component (polyester or polyether) and an about 2,000 molecular wt. component (polyester or polyether) may also be employed with aliphatic, alkylaromatic or aromatic diisocyanates or polyisocya-nates and low molecular weight chain extenders, such as diamines, polyamines or amino alcohols. The choice of the molecular weight of the polyether or polyester component is a matter of compromise. Polyether or polyester components of 500 molecular weight give membranes of highest selectivity, but decreased flux. Polyester or polyether of higher molecular weight (e.g., 2,000 and higher) give membrane of lower selectivity but with increased flux. Thus, the choice of the single molecular weight or blend is a matter of choice and compromise between selectivity and flux. The ratio of these components used in producing the polyurea/urethane copolymer is governed by the aforementioned characteristics possessed by the membranes useful for aromatic from saturate separation. The copolymer produced possesses a urea index of at least about 20% but less than 100%, preferably about 30% but less than 100%, most preferably about 40% but less than 100%. By urea index is meant the percentage of urea groups relative to the total urea plus urethane groups in the polymer. The copolymer also contains at least about 15 mole percent, and preferably at least about 20 mole percent aromatic carbon, expressed as a percent of the total carbon in the polymer. The copolymer also possesses a particular density of functional groups (DF ratio) defined as the total of C=O+NH per 1,000 grams of polymer, the density of functional group being at least about 10, preferably at least about 12 or greater. Finally, to insure that the functional groups are not all carbonyl, the C=O/NH ratio is less than about 8 and preferably less than about 5.0. This insures that there is sufficient hydrogen bonding within the polymer, resulting in strong polymer chain interactions and high selectivity.

Urethane and polyurethane membranes which do not possess the characteristics recited above are inferior for the separation of aromatics from saturates when compared to the membranes of the present invention. Polyurea/urethane membranes which are not aromatic (i.e. contain less than at least 15 mole percent aromatic carbon in the polymer) are inferior to the aromatic polyurea/urethane membranes which are the subject of the present invention.

The thin film composite membranes of the present invention are especially well suited for separating aromatics from saturates in heavy feeds, such as heavy cat naphtha, wherein the constituents making up the feed include, in some cases, highly complex, multiring, heavily substituted aromatic species.

As previously stated, the thin film composite membranes are produced from a polyurea/urethane copolymer made from dihydroxy or polyhydroxy compounds, such as polyethers or polyester of about 250 to 5,000 molecular weight, reacted with aliphatic, alkylaromatic or aromatic diisocyanates or polyisocyanates and low molecular weight chain extenders, such as diamines, polyamines or amino alcohols.

The polyester components are prepared from aliphatic or aromatic dicarboxylic acids and aliphatic or aromatic dialcohols. Aliphatic dicarboxylic acids refer to those materials having the general formula HOOCRCOOH where R contains 2 to 10 carbons (and may be either straight or branched chain configuration). Aromatic dicarboxylic acids refer to those materials having the general structure HOOCRCOOH where R is:

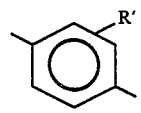   I

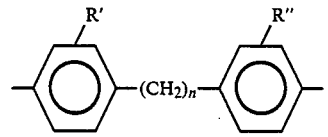   II wherein R' and R" may be the same or different and are selected from the group consisting of H and $C_1$-$C_5$ carbons or $C_6H_5$ and combinations thereof, and n is 0 to 4. It is to be understood that in the above formula each R' or R" may itself represent a mixture of H, $C_1$-$C_5$ or $C_6H_5$.

Dialcohols have the general structure HOROH where R may be:

—$(CH_2)_n$—   III

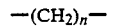   IV where n is 1 to 10, preferably 4 to 6, and R' is H, $C_1$ to $C_5$ or

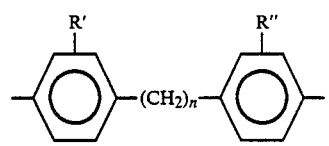   V where R', R" and n are defined in the same manner as for the aromatic dicarboxylic acids.

The diisocyanates are preferably aromatic diisocyanates having the general structure:

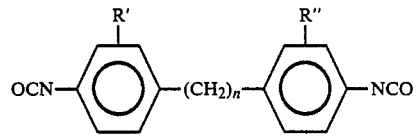   VI wherein R' and R" are the same or different and are selected from the group consisting of H, $C_1$-$C_5$ and $C_6H_5$ and n ranges from 0 to 4.

Diamine chain extenders have the general formula $H_2NRNH_2$ where R includes aliphatic and aromatic moieties such as —$(CH_2)_n$—   (VII)

where n is 1 to 10.

Also included are diamine chain extenders of the formula:

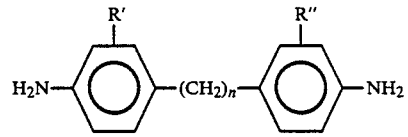   VIII where R' and R' are the same or different and are selected from the group consisting of H or Cl or $C_1$ to $C_5$ or $C_6H_5$ and n ranges from 0 to 4.

Examples of the polyether polyols useful in the present invention as polymer precursors are polyethylene glycols (PEG), polypropylene glycol (PPG), polytetramethylene glycol, PEG/PPG random copolymers, etc. having molecular weight ranging from about 250 to 4,000. Aliphatic diisocyanates which may be utilized are exemplified by hexamethylene diisocyanate (HDI), 1.6-diisocyanato-2,2,4,4-tetramethylhexane (TMDI), 1,4-cyclohexanyl diisocyanate (CHDI), isophorone diisocyanate (IPDI), while useful alkylaromatic diisocyanates are exemplified by toluene diisocyanate (TDI) and bitolylene diisocyanate (TODI). Aromatic diisocyanates are exemplified by 4,4'-diisocyanato diphenylmethane (MDI). Polyisocyanates are exemplified by polymeric MDI and (PMDI) and carbodiimide modified MDI. Useful amines are exemplified by polyethyleneimines and 2,2',2''-triaminotriethylamine. Useful amino alcohols are exemplified by 6-aminohexanol, 4-aminophenol, 4-amino-4'hydroxy-diphenylmethane.

Post crosslinking can be accomplished by chemical use of either additional diisocyanates or formaldehyde.

Polymer thermal stability also increases with increased aromaticity and the degree of hydrogen bonding. Increasing these characterisitcs by technique common to the art will increase the thermal stability of the polymer and thus enhance the utility of membranes made from said polymer for high temperature separation procedures, such as pervaporation.

The above are presented solely by way of example. Those skilled in the art, with the present teaching before them, can select from the innumerable materials available the various starting materials which upon combination as described herein will produce a polyurea/urethane copolymer or polyurea polymer which can then be used to produce its composite membranes useful for the separation of aromatics from saturates.

Due to the extreme thinness of the dense selective polyurea/urethane or polyurea layer the composite membrane exhibits extremely high flux while maintaining a very high degree of selectivity.

The solvent is permitted to evaporate. Heat is applied if needed to drive off the solvent. If a solvent of a low enough vapor pressure is employed the application of heat can be omitted.

The membranes are useful for the separation of aromatics from saturates in petroleum and chemical streams, and have been found to be particularly useful for the separation of large substituted aromatics from saturates as are encountered in heavy cat naphtha streams. The separation techniques which may successfully employ the membranes of the present invention include perstraction and pervaporation.

Perstraction involves the selective dissolution of particular components contained in a mixture into the membrane, the diffusion of those components through the membrane and the removal of the diffused components from the downstream side of the membrane by use of a liquid sweep stream. In the perstractive separation of aromatics from saturates in petroleum or chemical streams (particularly heavy cat naphtha streams) the aromatic molecules present in the feedstream dissolve into the membrane film due to similarities between the membrane solubility parameter and those of the aromatic species in the feed. The aromatics then permeate (or diffuse) through the membrane and are swept away by a sweep liquid which is low in aromatics content. This keeps the concentration of aromatics at the permeate side of the membrane film low and maintains the concentration gradient which is responsible for the permeation of the aromatics through the membrane.

The sweep liquid is low in aromatics content so as not to itself lower the concentration gradient. The sweep liquid is preferably a saturated hydrocarbon liquid with a boiling point much lower or much higher than that of the permeated aromatics. This is to facilitate separation, as by simple distillation. Suitable sweep liquids, therefore, would include $C_3$ to $C_6$ saturated hydrocarbons and lube basestocks ($C_{15}$-$C_{20}$).

The perstraction process is run at any convenient temperature, preferably as low as possible.

The choice of pressure is not critical since the perstraction process is not dependent on pressure, but on the ability of the aromatic components in the feed to dissolve into and migrate through the membrane under a concentration driving force. Consequently, any convenient pressure may be employed, the lower the better to avoid undesirable compaction or rupture of the membrane.

If $C_3$ or $C_4$ sweep liquids are used at 25° C. or above in liquid state, the pressure must be increased to keep in liquid phase.

Pervaporation, by comparison, is run at generally higher temperatures than perstraction and relies on vacuum on the permeate side to evaporate the permeate from the surface of the membrane and maintain the concentration gradient driving force which drives the separation processes. As in perstraction, the aromatic molecules present in the feed dissolve into the membrane film, migrate through said film and reemerge on the permeate side under the influence of a concentration gradient. The vacuum is maintained on the permeate side to remove the permeate from the surface of the membrane and thereby maintain the concentration gradient driving force. Pervaporative separation of aromatics form saturates can be performed at a temperature of about 25° C. for the separation of benzene from hexane but for separation of heavier aromtic/saturate mixtures, such as heavy cat naphtha, higher temperature of at least 80° C. and higher, preferably at least 100° C. and higher, more preferably 120° C. and higher should be used. Temperatures of about 170° C. have been successfully used with polyurea/urethane membranes of the present invention, the maximum upper limit being that temperature at which either the membrane is physically damaged. Vacuum on the order of 1-50 mm Hg is pulled on the permeate side. The vacuum stream containing the permeate is cooled to condense out the highly aromatic permeate. Condensation temperature should be below the dew point of the permeate at a given vacuum level.

The membrane itself may be in any convenient form utilizing any convenient module design. Thus, sheets of membrane material may be used in spiral would or plate and frame permeation cell modules. Tubes and hollow fibers of membranes may be used in bundled configurations with either the feed or the sweep liquid (or vacuum) in the internal space of the tube or fiber, the other material obviously being on the other side.

Most conveniently, the membrane is used in a hollow fiber configuration with the feed introduced on the exterior side of the fiber, the sweep liquid flowing on the inside of the hollow fiber to sweep away the permeated highly aromatic species, thereby maintaining the desired concentration gradient. The sweep liquid, along with the aromatics contained therein, is passed to separation means, typically distillation means, however, if a sweep liquid of low enough molecular weight is used, such as liquefied propane or butane, the sweep liquid can be permitted to simply evaporate, the liquid aromatics being recovered and the gaseous propane or butane (for example) being recovered and reliquefied by application of pressure or lowering of temperature.

The present invention will be better understood by reference to the following Examples which are offered by way of illustration and not limitation.

EXAMPLE 1

(a) A solution containing a polyurea/urethane polymer is prepared as follows. Two hundred forty-one grams (0.125 mole) of polyethylene adipate (MW =1928) and 62.5 grams (0.250 mole) of 4,4′diisocyanatodiphenylmethane were added to a 1 liter resin pot equipped with a stirrer and drying tube. The temperature was raised to 95° C. and held for 2.75 hours with stirring to produce an isocyanate-capped prepolymer.

(b) A stock solution was prepared from this prepolymer as follows. Nineteen point seven seven (19.77) grams of the above prepolymer was dissolved in 83.65 grams of dimethylformamide to produce a solution containing 0.00814 moles of prepolymer. To this was added a solution containing 1.62 grams (0.00816 moles) of 4,4′-diaminodiphenylmethane in 2.51 grams of dimethylformamide. The solution was stirred at room temperature for several hours until the condensation reaction was complete. The result was a solution containing 20.36 wt. % polyurea/urethane in dimethylformamide.

(c) An intermediate solution was prepared as follows. To 20.02 grams of the polyurea/urethane polymer solution from Example 1 was added 10.06 grams of cellosolve acetate and 10.05 grams of dioxane. The result was a solution containing 10.16 wt. % polymer.

(d) A coating solution was prepared as follows. To 5.03 grams of the solution from Example 2 was added 10.16 grams of 1,4-dioxane and 0.54 grams of crotyl alcohol. The resulting solution contained approximately 3.43 wt. % polymer and was a clear solution. A piece of polypropylene microporous material (Celgard 2500, MWCO 100,000) having an approximate pore size of 0.04 micron was clamped into a frame so that only one side would be exposed to the coating solution. The 3.43 wt. % polymer solution was poured onto the Celgard and allowed to stand just long enough to wet the surface; whereupon it was poured off. The membrane was placed in a vertical position to allow excess solution to run off and the solvent evaporate.

EXAMPLE 2

A second coating solution was prepared as follows. To 1.07 grams of the solution from (c) was added 4.14 grams of 1,4-dioxane and 0.10 grams of crotyl alcohol. The resulting solution contained approximately 2.05 wt. % polymer and was a clear solution. A piece of polypropylene microporous material (Celgard 2500) having an approximate pore size of 0.04 micron was clamped into a frame so that only one side would be exposed to the coating solution. The 2.05 wt. % polymer solution was poured onto the Celgard and allowed to stand just long enough to wet the surface; whereupon it was poured off. The membrane was placed in a vertical position to allow excess solution to run off and the solvent evaporate.

The polyurea/urethane thin film layer of the composite membranes of Examples 1 and 2 possessed the following characteristics:

| | Aromatic Carbon Content | C=O/NH | UI | DF |
|---|---|---|---|---|
| Membrane 1 | 25.5 | 4.67 | 50 | 13.0 |
| Membrane 2 | 25.5 | 4.67 | 50 | 13.0 |

EXAMPLE 3

For comparison, a dense film membrane of the same polymer composition was prepared in solution in dimethylformamide and cast onto a glass plate using a casting knife. The thickness of this membrane as measured by SEM was 11.5 microns.

Description of the Perstraction Test

In order to evaluate the performance of the membranes, a perstraction test was carried out in the following manner. Approximately 350 ml of model feed was placed into the right hand side of a perstraction apparatus. The membrane to be tested was then clamped between this section and the sweep chamber which was approximaely 3 mm deep. The coated side was positioned facing the sweep chamber. The feed was stirred magnetically and heated to the desired temperature. Sweep liquid was distilled from the permeate receiver and recirculated by gravity through the sweep chamber thus carrying away permeate. The sweep liquid was typically chosen to be an alkane that was much lighter than the feed for ease of separation. Samples were withdrawn from the permeate receiver as a function concentration as a function of time.

| Model Feed Compositions | | |
|---|---|---|
| Component | Weight % | |
| Model Feed | A | B |
| 1,4-xylene | 9.97 | 7.23 |
| 1,3,5-trimethylbenzene(mesitylene) | 10.16 | 9.13 |
| 1-decene | 20.91 | 22.89 |
| n-decane | 31.75 | 35.55 |
| 1/2/3/5-tetramethylbenzene(isodurene) | 9.60 | 9.53 |
| naphthalene | 8.49 | 5.71 |
| pentamethylbenzene | 9.12 | 9.96 |
| | 100.00 | 100.00 |

Selectivity in these tests was defined as:

$$\text{Selectivity } (\sigma) = \frac{(\text{Conc Species i/Conc n-decane})\text{permeate}}{(\text{Conc Species i/Conc n-decane})\text{feed}}$$

EXAMPLE 4

Perstraction tests using model feeds A and B were run on the solution-coated membranes from Examples 1 and 2 as well as the unsupported dense film from Example 3. Results are shown in the following table.

TABLE 1

| Membrane from Example | 1 | 2 | 3 |
|---|---|---|---|
| Model Feed | B | B | A |
| Temperature (°C.) | 30 | 30 | 30 |
| Total Flux (kg/m²/d) | 26.3 | 35.1 | 2.4 |
| Selectivity vs n-decane to | | | |
| Xylene | 13.2 | 12.8 | 13.3 |
| Mesitylene | 7.6 | 7.5 | 7.1 |
| Isodurene | 5.8 | 5.7 | 5.3 |
| 1-Decene | 1.7 | 1.7 | 1.7 |

As can be seen, the very thin membranes that were prepared by the process of the current invention had over an order of magnitude higher flux at the same selectivity than the thicker film.

EXAMPLES 5–24

The following examples are presented to demonstrate the importance in the present invention of using the 4 component solvent system recited. Leaving out any one of the 4 components results in production of a membrane which exhibited severe surface imperfections and discontinuities when evaluated under a dye solution. Only those membranes produced using all 4 components passed the dye test, that is were membranes which exhibited uniform surfaces when examined under dye. The polymers employed in producing the membranes are those reported in Examples 1 and 2. The dye test mentioned employs a reactive dye known as Cibacet Blue which reacts with the NH groups in polyurea/urethane or nylon. The dye tested employed a 2% aqueous solutuion of the dye.

TABLE 2

COATING SOLUTIONS USED TO PRODUCE POLYUREA/URETHANE MEMBRANES TESTED UNDER A DYE SOLUTION FOR SURFACE CONTINUITY

| Composition (wt %) | Solution | | | | | | | |
|---|---|---|---|---|---|---|---|---|
| | A | B | C | D | E | F | G | H |
| Polymer | 11.33 | 11.32 | 11.30 | 7.75 | 10.04 | 4.77 | 5.00 | 6.79 |
| DMF | 100.00 | 44.27 | 44.22 | 52.5 | 39.28 | 39.26 | 39.40 | 26.55 |
| Dioxane | — | 55.72 | 27.87 | — | 24.74 | 24.73 | 24.67 | 33.39 |
| Cellosolve Acetate | — | — | 26.79 | — | 24.78 | 24.79 | 24.68 | — |
| Crotyl Alcohol | — | — | — | 47.5 | — | — | — | 6.67 |
| Allyl Alcohol | — | — | — | — | 11.18 | 11.22 | 11.21 | — |
| Methyl Cellosolve | — | — | — | — | — | — | — | 33.38 |
| Coating Performance* | 1 Poor | 1 Poor | 2 Poor | 2 Poor | 3 Better | 1 Poor | 1 Poor | 4 Best |

*Performance:
1 = Poor, coating beaded up
2 = Some coating but still beading up
3 = Better coating, small amount of non-uniformity
4 = Good coating, appeared continuous in dye test TABLE 2a

ADDITIONAL POLYUREA/URETHANE COATING SOLUTIONS

| Component/wt % | S2 | S3 | S4 | S5 | S6 | S7 | S8 | S9 | S10 | S11 | S12 | S13 |
|---|---|---|---|---|---|---|---|---|---|---|---|---|
| Polymer | 5.31 | 5.15 | 5.03 | 4.73 | 4.94 | 5.49 | 4.95 | 3.50 | 2.24 | 2.09 | 1.57 | 0.765 |
| DMF | 47.34 | 47.92 | 46.45 | 43.70 | 45.99 | 20.49 | 18.47 | 13.70 | 8.44 | 8.17 | 6.15 | 2.99 |
| Dioxane | 26.10 | — | — | — | — | 63.48 | 60.81 | 74.10 | 82.48 | 84.74 | 89.31 | 94.10 |
| Formic Acid | 26.55 | 26.78 | — | — | 25.70 | — | — | — | — | — | — | — |
| Cellosolve Acetate | — | 25.29 | 25.74 | 24.21 | 24.27 | 12.99 | 11.71 | 8.65 | 5.31 | 5.15 | 3.89 | 1.89 |
| Acetic Acid | — | — | 27.80 | 26.15 | — | — | — | — | — | — | — | — |
| Crotyl Alcohol | — | — | — | 5.92 | 4.04 | 5.00 | — | 3.55 | 3.81 | 1.91 | 1.65 | 0.977 |
| Formamide | — | — | — | — | — | — | 9.00 | — | — | — | — | — |
| Coating* Quality | 1 | 1 | 1 | 1 | 1 | 4 (TFC-7) | 1 | 4 | 4 | 4 (TFC-8) | 4 (TFC-9) | 4 (TFC-19) |

*same as in Table 2

What is claimed is:

1. A method for producing a composite membrane consisting of a thin active layer of polyurea/urethane on a porous backing, said method comprising producing a solution of polyurea/polyurethane polymer in a multi component solvent system consisting of (a) an aprotic solvent, (b) a cyclic ether, (c) cellosolve acetate or methyl cellosolve and (d) a wetting agent wherein the components in the solvent are used in a parts per hundred ratio of a/b/c/d in the range about 3-27/94-33-/2-33/1-7, depositing a thin film of the polyurea/urethane polymer in solvent onto a microporous support substrate, evaporating said solvent to produce a thin film of polyurea/urethane copolymer on the support.

2. The method of claim 1 wherein the aprotic solvent is dimethyl formamide, the cyclic ether is dioxane and the wetting agent is crotyl alcohol.

3. The method of claim 2 wherein the microporous support substrate is selected from polyolefins and teflon.

4. The method of claim 1 or 2 wherein the polyurea/urethane copolymer concentration in the multicomponent solvent system is up to about 40 parts polymer based on 100 parts solvent.

5. The method of claim 1 or 2 wherein the polyurea/urethane copolymer concentration in the multicomponent solvent system is in the range of about 0.5 to 20 parts polymer per 100 parts solvent.

6. The method of claim 1 or 2 wherein the polyurea/urethane copolymer deposited on the microporous support substrate is characterized by possessing a urea index of at least about 20% but less than 100%, an aromatic carbon content of at least about 15 mole percent, a functional group density of at least about 10 per 1000 grams and a C=O/NH ratio of less than about 8.

* * * * *